Figure 1:
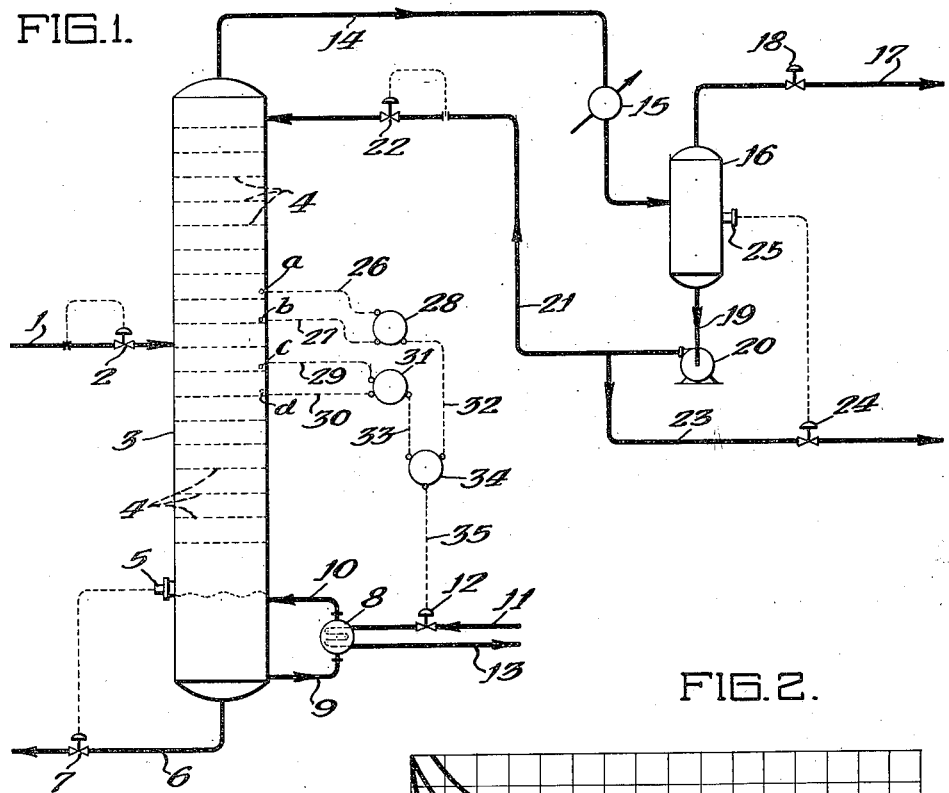

Jan. 1, 1952 — D. M. BOYD, JR — 2,580,651

FRACTIONATION CONTROL

Filed May 11, 1949

Inventor:
David M. Boyd Jr.
By: M. P. Venema, Attorney
Philip J. Liggett, Agent

UNITED STATES PATENT OFFICE 2,580,651

FRACTIONATION CONTROL

David M. Boyd, Jr., Clarendon Hills, Ill., assignor to Universal Oil Products Company, Chicago, Ill., a corporation of Delaware Application May 11, 1949, Serial No. 92,559

6 Claims. (Cl. 202—40)

This invention relates to an improved method and means for operating a fractionating column to obtain the maximum separation of components for a given amount of heat consumption. More specifically, the invention concerns automatic means for maintaining a substantially uniform temperature and composition gradient throughout the height of a fractionating column by the use of indicating and control means connecting with the column both above and below the feed point thereto and as a result provides improved efficiency from each of the trays of the column.

In a usual fractionating operation, the mixed or multi-component fluid stream is charged to approximately the mid-point of the column, which is a vertically disposed chamber having a plurality of spaced bubble trays or decks, or alternately, a substantial depth of suitable packing material which will effect a desirable mixing of the counter currently flowing liquid and vapor streams within the column. Heat is normally supplied to the column by means of a reboiler which connects with the lower portion of the column and to a liquid reservoir maintained therein by means of suitable level control means, while reflux is normally returned to the top of the column in a regulated quantity suitable to permit proper rectification within the upper portion of the column. Also, in present types of continuously operating fractionating column and control systems, a temperature or composition indicating and controlling device is connected to the interior of the column at either the stripping section or the rectification section, and the heat input to the column is regulated by this temperature controller through either varying the heat input at the reboiler, or changing the quantity of reflux returned to the top of the column. Alternately, a material balance control system is sometimes utilized which provides a flow controller on the bottoms produtc that varies with changes in the flow rate in the feed stream to the column. Still another control method, is the use of a reference material at a selected control point in the column, whereby the differential between the vapor pressure in the column and that of the reference fluid controls the heat supplied to the fractionating column. Inasmuch as temperature is one means of measuring compositions, either temperature or composition measuring means may be utilized to provide an indication of temperature and composition gradient within the column.

While the foregoing methods of controlling fractionating by automatic means are in general satisfactory to effect fractionation and separation of the components of the feed stream, and to provide an overhead product of substantially constant composition, such methods do not necessarily maintain a desirable uniform temperature and composition gradient throughout the length of the column. In the event that the column is operating such as to move too much material overhead, the temperature gradient curve of the column will have a steep vertical rise just above the feed tray, while conversely, the column is operating so as to remove an insufficient amount overhead, the curve will have a steep vertical dip in it just below the feed tray. These vertical slopes in the temperature gradient curve column indicate that the trays in that zone are not operating at their maximum efficiency, and the given tower or column is not providing the maximum separation of the components for a given amount of heat consumption.

Thus, it is a principal object of the present invention to utilize differential temperature or composition measuring means both above and below the feed point to the column in a manner to measure differences in the temperature or composition gradient which may occur during operation and to effect therefrom a control of the heat distribution to the column whereby to substantially eliminate undesirable gradients and provide a uniform gradient conducive to maximum operating efficiency.

It is a further object of the present invention to use a set of automatic temperature or composition indicating and control means at spaced points both above and below the feed point to the column, and have differential comparing and controlling means connecting therewith which in turn is suitable to control or vary the heat input to the column to maintain a substantially uniform temperature and composition gradient therethrough.

Briefly, the present invention embodies an improved method and means for operating a fractionating column for the separation of a mixed or multi-component feed stream with at least overhead and bottom components being withdrawn from the column, which comprises, maintaining a composition indicating means at spaced points above the feed point of the column and additional composition indicating means at spaced points below the feed point of the column, comparing the gradient above the feed point with the gradient below the feed point, and regulating the heat distribution to the fractionating column proportional to differences in the gradients measured above and below the feed point to the column, whereby to maintain a substantially uniform temperature and composition gradient therethrough.

In a preferred embodiment of the invention, automatically operating temperature or composition indicating and control means are used within the column and exteriorly thereof, such that an automatic comparison of the temperature or composition gradients is made in a continuous manner and the heat input to the column regulated continuously thereby to provide the desired uniform temperature and operation throughout the entire length of the column and a resulting improved efficiency of the column for the separation of the desired components. The comparison controller may be utilized to vary and control the heat input, or distribution of heat, to the column in various ways. For example, the controller may connect with the heat supply means to the reboiler of the fractionating column in order to effect a direct change in the heat supplied to the lower portion of the column, or alternately, the controller may be connected to a flow control valve in the reflux line such that the quantity of cool reflux medium returned to the upper portion of the column may be varied as desired, to in turn provide a more uniform temperature gradient through the column. While still another method may comprise the connection of the controller to a flow control valve in the overhead product line, whereby to regulate the withdrawal of the overhead stream which is subsequently cooled and collected in a receiver.

Also, while as noted in the preferred embodiment of the invention, the operation is effected through the use of automatic control instruments, it is not intended to limit the invention and improved operation to the use of any one particular type of instrument or controls. The temperature or composition indicating means and the differential measuring and indicating means may be of any of the conventional types utilized in processing equipment, and the output signals from such instruments may be compared by either electrical or pneumatic means, as utilized by the common types of instruments familiar to those persons who are designers and operators of processing units. In addition to temperature indicating devices, various types of vapor pressure devices for indicating composition may be utilized.

Reference to the accompanying drawing and the following description and explanation thereof will serve to further clarify the operation of the present invention as well as point out additional features and advantages which may be derived therefrom.

Figure 1 of the drawing shows diagrammatically a fractionating column with automatic means for controlling the column to maintain a uniform temperature and composition gradient throughout, in accordance with one embodiment of the invention.

Figure 2:
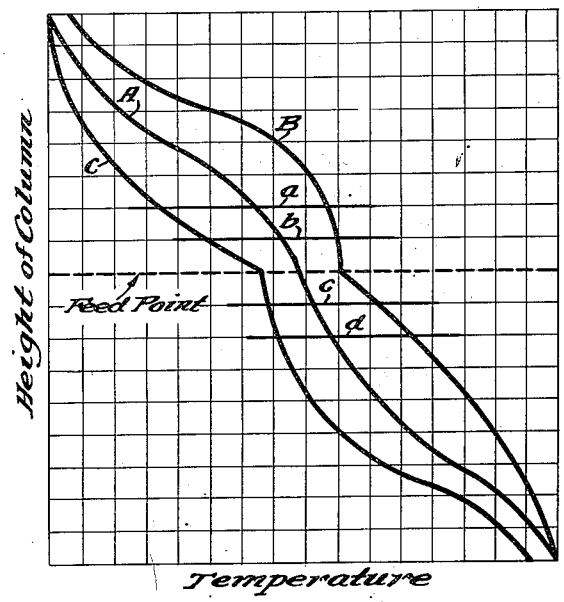

Figure 2 of the drawing shows diagrammatically typical temperature gradient curves for a fractionating column operating both efficiently and inefficiently.

Referring now to Figure 1 of the drawing, there is shown a feed line 1, having a suitable flow control means 2, such that a mixed or multi-component feed stream may be introduced into the fractionating column 3 at an intermediate point. The column 3 is indicated as a vertically disposed column having a plurality of bubble decks or trays 4 at vertically spaced distances and in a quantity sufficient to provide fractionation and separation of the feed stream. In the present embodiment, it is assumed that the pressure is maintained substantially constant within the column and that the feed stream is regulated at a substantially constant flow rate by means of a flow controller 2. A body of liquid is maintained within the lower portion of the column 3 by means of a level controller 5 which in turn regulates the rate of liquid withdrawal through the bottoms outlet line 6, by means of control valve 7. The net heat input to the column is provided through a reboiler 8 which in turn is connected to the lower portion of the column by means of lines 9 and 10. Heat is supplied to the reboiler 8 by means of steam or other hot fluid medium, the heating medium passing through line 11 having control valve 12 and being discharged through the outlet line 13.

The overhead product stream from the fractionating column 3 is withdrawn by way of line 14 and passed through a condenser 15 to a condensate receiver 16. Uncondensed vapors are vented through line 17 and control valve 18, while the resulting condensed product stream is withdrawn from the lower portion of the receiver 16 through line 19 and pump 20. A portion of the condensate is returned to the upper end of the column as reflux by passage through line 21 and a flow controller 22, while the remaining portion of the liquid passes through line 23 and flow control valve 24 to storage, or to other processing equipment. In this embodiment, the flow controller 22 operates to maintain a substantially constant quantity of reflux to the top of the column 3, while a liquid level controller 25 connecting with the receiver 16 serves to automatically control the operation of valve 24 in line 23, whereby the total withdrawal is regulated to maintain a level within the receiver.

In accordance with the present invention, two temperature measuring devices $a$ and $b$ are placed at vertically spaced points above the feed inlet to the column 3 and two temperature measuring devices $c$ and $d$ are placed at vertically spaced points below the feed level to the column such that variations in the temperature gradient both above and below the feed point to the column may be noted and compared to in turn provide means for regulating the heat distribution to the column. Each of the temperature measuring devices $a$ and $b$ connect through suitable lines or transmitting means 26 and 27 to a differential temperature measuring and controlling device 28, the latter being suitable to transmit and indicate differential temperature changes, or in other words, variations in a temperature gradient. Likewise, the temperature measuring or sensitive devices $c$ and $d$ connect through suitable lines 29 and 30 to a differential temperature measuring instrument 31, that is suitable to detect and transmit changes in temperature gradient below the feed point in the column. The differential temperature transmitting devices 28 and 31 connect through suitable lines or means 32 and 33 to a control instrument 34, which is in turn suitable to receive impulses corresponding to changes in temperature gradient and control or regulate as may be desired, responsive to these variations in temperature gradient. In other words, the device 34 is a control instrument which is responsive to comparisons and variations in differential temperature transmitted thereto from temperature gradient indicators.

In the embodiment of Figure 1, the comparison instrument 34 controls through a suitable line 35 the flow control valve 12 in line 11, so that the heat input through the reboiler 8 is regulated in response to variations in the temperature gradient of the column, as measured and indicated through the temperature sensitive devices $a$, $b$, $c$ and $d$.

As has been noted hereinabove, it is desirable to maintain in any fractionating column a relatively smooth temperature gradient curve throughout the height of the column so that the composition changes substantially uniformly from tray to tray in the column and such that each of the trays can operate at their maximum efficiency. In Figure 2 of the drawing, there is a graph or diagram which shows typical temperature gradient curves obtained by plotting temperature in the column versus points or levels throughout the entire height of the column.

Curve A in Figure 2 is a typical temperature gradient curve for a column operating under substantially efficient conditions, the gradient being fairly smooth and continuous from top to bottom of the column. However, in the event that the column is operating in a manner to cause too much of the feed material to pass overhead from the column, the temperature gradient curve will have a steep vertical rise at a point just above the feed tray as indicated in curve B of the diagram. While, if the column is operating in a manner where insufficient overhead material is withdrawn from the column, the temperature gradient curve has a steep vertical dip at a point just below the feed tray, as indicated in the curve C. The feed point or level in the diagram of Figure 2 is indicated by the broken line extending horizontally across the curves A, B and C. Also, the horizontal lines indicated as $a$, and $b$ show the level for the temperature measurements within the fractionating column at points above the feed level, while horizontal lines $c$ and $d$ indicate the levels for measuring temperature at spaced points in the column below the feed point.

It may be seen from the temperature gradient curves, that for substantially normal or optimum conditions, as indicated in curve A, a given temperature differential exists between the points $a$ and $b$ and the points $c$ and $d$, and the instrument 34 of Figure 1 of the drawing provides means for comparing the temperature differentials and effecting regulation and control responsive to changes in desired differentials. In curve B, where too much material is going overhead from the column, it may be noted that the differential between the points $a$ and $b$ is substantially smaller than in curve A, or conversely, the temperature differential between points $c$ and $d$ below the feed level, is substantially larger than in curve A, so that such differentials would affect the operation of the comparing device 34 to effect a desired impulse for controlling the heat input or heat distribution to the fractionating column to bring about the elimination of the steep portion of the curve B. Similarly, it may be noted that the temperature differentials between the points $a$ and $b$ and points $c$ and $d$ in the curve C, where insufficient material is taken overhead from the column, the comparing instrument 34 may be connected with heat controlling means to compensate for this inefficient operation and re-establish the operation of the column to provide a more uniform temperature gradient.

The heat input or heat distribution to a fractionating column may of course be varied and regulated in more than one way. The embodiment of Figure 1 provides the regulation and control of the heat input to the reboiler 8, by means of controller 34 connecting with valve 12; however, as will hereinafter be noted, other means of temperature control may be effected from the comparison and regulating instrument 34. In the temperature gradient curve B, the differential temperature between points $a$ and $b$ is small or substantially less than between points $c$ and $d$, the instrument 34 may be connected to the valve 12 in a manner to reduce the heat input to the reboiler 8 and in turn reduce the temperature within the stripping section of the column and to provide a reduction in the amount of overhead product being withdrawn. Conversely, where the temperature differential is between points $c$ and $d$ is small or substantially less than between points $a$ and $b$, then the comparison and regulating device 34 operates to increase the heat input to the lower portion of the column and bring back a more uniform temperature gradient throughout the height of the column, as well as cause the production of more overhead product from the column.

The single point temperature measuring devices, or single control point instruments with accompanying control systems, as used in present columns, do not avoid in any direct manner the steep vertical slopes in the temperature gradient curves and as a result do not control composition above and below the feed tray or trays, as is accomplished by the present method of operation. By controlling temperature gradient throughout the column, the trays above and below the feed point are maintained at a high operating efficiency and as a result there is a maximum amount of separation of components in the feed stream for a given amount of heat input to the column.

Although not shown in the drawing, another embodiment of the present invention comprises the regulation of the reflux stream to the top of the column responsive to or in accordance with undesirable changes in temperature gradient as measured by the comparison instrument 34. The controller 34 may be directly connected to a flow control valve in line 21, such that for a fixed amount of heat being charged to the lower portion of the column by a fixed controller on the heating medium to the reboiler 8, there will be temperature regulation of the column through the quantity of reflux returned thereto.

In still another embodiment, the regulation or distribution of heat to the fractionating column may be maintained through the regulation of the quantity of feed to the column through line 1, in what is known to those familiar with the art as a material-balance control system. In this case, the controlling and regulating instrument 34 may be connected to a flow controller in line 1 and secondary control means connects to a flow regulator in the bottoms withdrawal line 6, such that the heat distribution throughout the column is regulated by the quantity of feed introduced into the column for a fixed amount of heat input thereto.

It may also be pointed out that it is not intended to limit the present invention to any one type of control instruments, for any of the suitable and customary types of electrical or pneumatic control instruments that measure temperature or composition differences and will provide regulation and control in accordance with differential gradients may be used within the scope of this invention. Further, it is not intended to limit the spacing or the positioning of the temperature or composition sensitive devices at the points above and below the feed level, for obviously, such points are preferably located such that they will provide a measure of temperature and composition gradient in the critical portion of the column above and below the feed point. This spacing will vary in accordance with the size of the column, as well as in accordance with the type of mixtures which are being fractionated therein.

I claim as my invention:

1. In the fractionation of a mixed feed stream wherein at least overhead and bottom components are withdrawn, the method of obtaining a substantially uniform temperature and composition gradient throughout the column, which comprises, maintaining a pair of temperature indicating means at vertically spaced points above the level of introducing said mixed feed stream to the column, maintaining a pair of temperature indicating means at vertically spaced points below said feed level to the column, measuring temperature gradient above and below said feed level directly from said indicating means, measuring the differential between the temperature gradient above the feed and the temperature gradient below the feed level and regulating the heat distribution to said column responsive to changes in the differential between said temperature gradients.

2. In the fractionation of a mixed feed stream within a fractionating column wherein at least overhead and bottom components are withdrawn therefrom, the improved method of controlling and maintaining a uniform temperature and composition gradient throughout said column, which comprises, maintaining a plural number of automatic temperature indicating means at spaced points above the level of introducing said feed to said column and a plural number of automatic temperature indicating means at spaced points below said feed level, automatically determining the temperature gradient in said column above and below said feed level, measuring the differential between the temperature gradient above said feed level and the temperature gradient below said feed level, and effecting a continuous automatic regulation of the heat distribution to said column responsive to changes in the differential between the two gradients whereby to maintain said desired uniform temperature and composition gradient throughout the entire column.

3. The method of claim 2 further characterized in that the regulation of said heat distribution to said column comprises controlling the heat input to the lower portion of said column.

4. The method of claim 2 further characterized in that said regulation of the heat distribution to said column comprises the regulation of the quantity of reflux material returned to the upper portion of said column.

5. In a fractionating column having a feed inlet at an intermediate point in the height thereof, the combination of a pair of temperature indicators at vertically spaced points above said inlet, a pair of temperature indicators at vertically spaced points below said inlet, a temperature gradient measuring device connected to each of said pairs of temperature indicators, and means coacting with said devices for regulating the heat distribution to said column in response to the differential between the temperature gradient above said inlet and the temperature gradient below said inlet.

6. In a fractionating column having a feed inlet at an intermediate point in the height thereof, the combination of a pair of temperature indicators at vertically spaced points above said inlet, a pair of temperature indicators at vertically spaced points below said inlet, a temperature gradient measuring device connected to each of said pairs of temperature indicators, and means coacting with said devices for regulating the supply of heat to the lower portion of the column in response to the differential between the temperature gradient above said inlet and the temperature gradient below said inlet.

DAVID M. BOYD, JR.

REFERENCES CITED

The following references are of record in the file of this patent:

UNITED STATES PATENTS

| Number | Name | Date |
|--------|------|------|
| 1,587,188 | Schneible | June 1, 1926 |
| 1,815,129 | Peters | July 21, 1931 |
| 2,022,809 | Kramer | Dec. 3, 1935 |
| 2,252,550 | Bragg | Aug. 12, 1941 |
| 2,386,831 | Wright | Oct. 16, 1945 |

OTHER REFERENCES

"Automatic Control of Fractionating Towers" by V. V. St. L. Tivy; "The Oil & Gas Journal," November 25, 1948.